Patented June 24, 1930

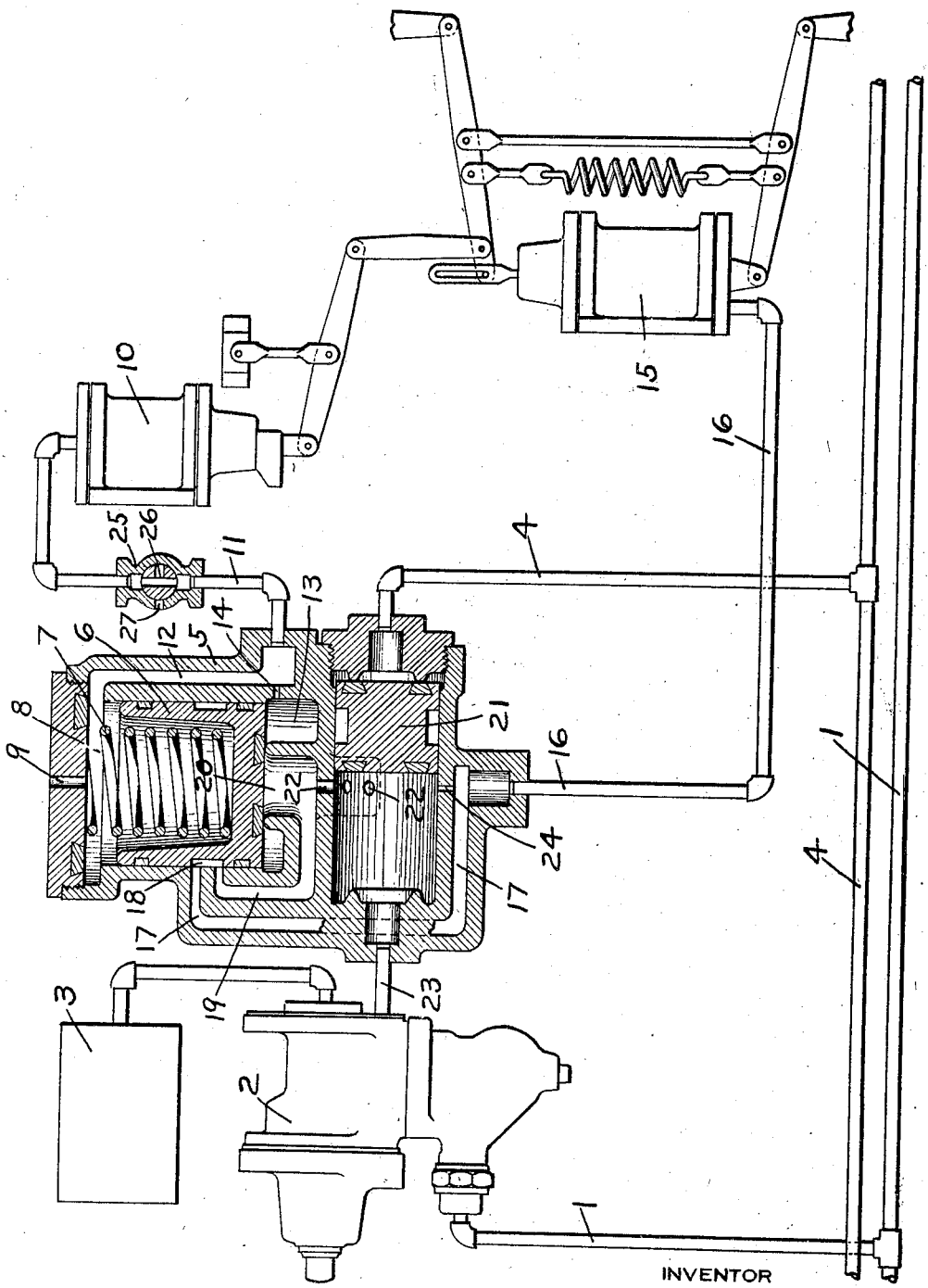

1,765,390

UNITED STATES PATENT OFFICE

HARRY J. WINTER, OF LONDON, ENGLAND, ASSIGNOR TO THE WESTINGHOUSE AIR BRAKE COMPANY, OF WILMERDING, PENNSYLVANIA, A CORPORATION OF PENNSYLVANIA

FLUID-PRESSURE-BRAKE SYSTEM

Application filed November 5, 1928, Serial No. 317,150, and in Great Britain February 2, 1928.

This invention relates to fluid pressure brakes, and more particularly to a brake equipment provided with empty and load brake cylinders for the purpose of varying the braking effort in accordance with the load on the car.

One object of my invention is to provide an empty and load brake equipment in which upon applying the brakes, the effective stroke of the empty brake cylinder piston is rapidly effected and substantially completed before fluid under pressure is supplied to the load brake cylinder, while upon releasing the brakes, fluid under pressure is first released from the load brake cylinder.

Another object of the invention is to provide a generally improved and simplified empty and load brake equipment.

In the accompanying drawing, the single figure is a diagrammatic view, partly in section, of an empty and load brake equipment embodying my invention.

The equipment shown is of the combined automatic and straight air type, though the invention may be employed, if desired, either with an automatic or a straight air brake system.

As shown in the drawing, the equipment may comprise an automatic brake system including the usual brake pipe 1, triple valve device 2, and auxiliary reservoir 3, and a straight air brake pipe 4. A controlling valve device is provided comprising a casing 5 having a vertical cylinder containing a piston valve 6.

The piston valve is normally held to its lower seat by a coil spring 7 and the chamber 8 above the piston valve is open to the atmosphere through port 9. A load brake cylinder 10 is connected through pipe 11 and passage 12 with chamber 8 and passage 12 is connected to chamber 13 below the piston valve through a restricted port 14.

An empty brake cylinder 15 is connected to a pipe 16 which leads to passage 17 in the casing 5 and when the valve piston 6 is seated in its lower position, said passage is connected through a groove 18 in the piston with a passage 19, which leads to a chamber 20 at the inner seated area of the valve piston.

A double check valve 21 is disposed in a horizontal cylinder provided in the casing 5. Ports 22 lead from the cylinder containing the check valve 21 to chamber 20.

The chamber at one side of the double check valve 21 is open to pipe 23, through which the triple valve device 2 operates to supply fluid under pressure to the brake cylinder in applying the brakes and the straight air pipe 4 leads to the chamber at the opposite side of the double check valve.

In operation, if an automatic application of the brakes is effected by a reduction in brake pipe pressure, fluid under pressure is supplied from the auxiliary reservoir 3 by operation of the triple valve device 2 to pipe 23 and enters the check valve chamber, causing the double check valve 21 to be shifted to its right hand seat, thus cutting off communication from the straight air pipe 4.

Fluid under pressure then flows through the ports 22 to chamber 20 and passage 19 and thence through groove 18 and passage 17 to pipe 16 and the empty brake cylinder 15.

Fluid under pressure is thus rapidly supplied to the empty brake cylinder, the piston of which then moves out to take up the slack in the brake rigging and exert a corresponding braking effort on the wheels of the vehicle. As soon as the pressure in the empty brake cylinder and in chamber 20 reaches a predetermined value, the piston valve 6 is moved upwardly against the pressure of the spring 7. When the piston valve 6 moves from its lower seat, the entire area of the piston is exposed to brake cylinder pressure and the piston consequently moves rapidly to its upper seat.

In the upper position of the piston valve, communication is cut off from passage 12 to the atmospheric exhaust port 9 and from passage 19 to empty brake cylinder passage 17, while communication is opened from chamber 20 to chamber 13, so that fluid under pressure is now supplied from chamber 13 through the restricted port 14 to passage 12 whence fluid under pressure flows through pipe 11 to the load brake cylinder, at a relatively low rate.

The flow of fluid under pressure to the empty brake cylinder 15 continues through the restricted port 24, so as to permit the empty brake cylinder pressure to build up gradually to the final brake cylinder pressure.

It will thus be seen that fluid under pressure is initially and rapidly supplied to the empty brake cylinder and then, when a predetermined pressure is obtained in the empty brake cylinder, corresponding with the pressure of the spring 7, fluid under pressure is relatively slowly supplied to the load brake cylinder, while the further supply of fluid under pressure to the empty brake cylinder continues at a relatively slow rate.

It will be understood that the load port 14 is so proportioned as to enable the pressure to build up on the load brake cylinder at the desired rate, while the empty port 24 is so proportioned as to ensure the desired final rate of build up in empty brake cylinder pressure.

When the brake pipe pressure is increased to effect the release of the brakes, the triple valve device 2 operates to connect pipe 23 with the atmosphere, and fluid is vented from the empty brake cylinder 15 through the port 24 and from the load brake cylinder 10 through the port 14.

As soon as a predetermined reduction in pressure in the load brake cylinder has been effected, the piston valve 6 returns to its lower seat, thereby permitting fluid to be vented from the load brake cylinder 10 direct to the atmosphere by way of the port 9. At the same time, free communication from the empty brake cylinder 15 to the triple valve device is established through the groove 18 in the piston valve and the final exhaust from the empty brake cylinder takes place through the groove 18, the rate of flow, however, being less than the rate of release of fluid from the load brake cylinder, through the port 9.

When a straight air application of the brakes is effected, the pressure of fluid supplied to the straight air pipe 4 operates to shift the double check valve 21 to its extreme left hand position, the flow of fluid from the check valve cylinder to the empty and load brake cylinders and the release of fluid therefrom, taking place through the same ports and passages and in the same manner as hereinbefore described in connection with an automatic application and release of the brakes.

The pipe 11, leading to the load brake cylinder 10 is provided with a cut-out cock 25, so that when the vehicle is empty or lightly loaded, the cock may be turned to a position in which communication from the load brake cylinder to the controlling valve device is cut off.

In this position, a port 26 preferably connects the load brake cylinder with an atmospheric exhaust port 27, so that the load brake cylinder will be maintained at atmospheric pressure.

While one illustrative embodiment of the invention has been described in detail, it is not my intention to limit its scope to that embodiment or otherwise than by the terms of the appended claims.

Having now described my invention, what I claim as new and desire to secure by Letters Patent, is:—

1. In an empty and load brake apparatus, the combination with an empty and a load brake cylinder, of means for supplying fluid under pressure to the empty brake cylinder, and means operated upon a predetermined increase in pressure in the empty brake cylinder, for supplying fluid under pressure to the load brake cylinder and for limiting the rate of flow to the empty brake cylinder.

2. In an empty and load brake apparatus, the combination with an empty and a load brake cylinder, of means for supplying fluid under pressure to the empty brake cylinder, and means operated upon a predetermined increase in pressure in the empty brake cylinder for supplying fluid under pressure to the load brake cylinder at a predetermined slow rate and to the empty brake cylinder at a predetermined slow rate.

3. In an empty and load brake apparatus, the combination with an empty and a load brake cylinder, of means for supplying fluid under pressure to the empty brake cylinder, and means for first supplying fluid under pressure to the empty brake cylinder only at a rapid rate and then to both brake cylinders at a relatively slow rate.

4. In an empty and load brake apparatus, the combination with an empty and a load brake cylinder, of means for supplying fluid under pressure to the empty brake cylinder, and means for first supplying fluid under pressure to the empty brake cylinder only at a rapid rate and then, upon a predetermined increase in pressure in the empty brake cylinder, to both the empty and the load brake cylinders at a relatively slow rate.

5. In an empty and load brake apparatus, the combination with an empty and a load brake cylinder, of means for supplying fluid under pressure to the empty brake cylinder, and a piston valve controlling communication through which fluid under pressure is supplied to the empty brake cylinder and operated upon a predetermined increase in pressure in the empty brake cylinder for cutting off said communication and for opening a communication through which fluid under pressure is supplied to the load brake cylinder.

6. In an empty and load brake apparatus, the combination with an empty and a load brake cylinder, of means for supplying fluid under pressure to the empty brake cylinder, and a piston valve controlling communication through which fluid under pressure is supplied to the empty brake cylinder and operated upon a predetermined increase in pressure in the empty brake cylinder for cutting off said communication and for opening a restricted communication, through which fluid under pressure is supplied to the load brake cylinder.

7. In an empty and load brake apparatus, the combination with an empty and a load brake cylinder, of means for supplying fluid under pressure to the empty brake cylinder, a spring, and a piston valve subject to the opposing pressures of the empty brake cylinder and said spring and operating upon a predetermined increase in pressure in the empty brake cylinder for opening a restricted communication, through which fluid under pressure is supplied to the load brake cylinder.

8. In an empty and load brake apparatus, the combination with an empty and a load brake cylinder, of means for supplying fluid under pressure to the empty brake cylinder, and valve means operated upon a predetermined increase in pressure in the empty brake cylinder for opening a communication through which fluid under pressure is supplied to the load brake cylinder and upon a predetermined decreased in pressure in the load brake cylinder for opening a communication from the load brake cylinder direct to the atmosphere.

9. In an empty and load brake apparatus, the combination with an empty and a load brake cylinder, of means for supplying fluid under pressure to the empty brake cylinder, and valve means operated upon a predetermined increase in pressure in the empty brake cylinder for opening a communication through which fluid under pressure is supplied to the load brake cylinder and for restricting the rate of flow of fluid to the empty brake cylinder and operating upon a predetermined decrease in pressure in the load brake cylinder for opening a direct exhaust port to the load brake cylinder.

10. In an empty and load brake apparatus, the combination with an empty and a load brake cylinder, of means for supplying fluid under pressure to the empty brake cylinder, valve means operated upon a predetermined increase in pressure in the empty brake cylinder for opening a communication through which fluid under pressure is supplied to the load brake cylinder, and valve means operated upon a predetermined increase in pressure in the empty brake cylinder for opening communication through a restricted port, through which fluid under pressure is supplied to the load brake cylinder and for limiting the flow to the empty brake cylinder by flow through a restricted port, the initial release of fluid from the brake cylinders being by way of said restricted ports, and said valve means being operated upon a predetermined decrease in pressure in the load brake cylinder, for opening a direct atmospheric exhaust port to the load brake cylinder.

In testimony whereof I have hereunto set my hand, this 22nd day of October, 1928.

HARRY J. WINTER.